United States Patent [19]

Niinivaara

[11] Patent Number: 4,729,503

[45] Date of Patent: Mar. 8, 1988

[54] METHOD AND EQUIPMENT FOR UNDERWATER ATTACHMENT

[76] Inventor: Ensi K. J. Niinivaara, 45610, Koria, Finland

[21] Appl. No.: 910,217

[22] PCT Filed: Jan. 9, 1986

[86] PCT No.: PCT/FI86/00003

§ 371 Date: Sep. 8, 1986

§ 102(e) Date: Sep. 8, 1986

[87] PCT Pub. No.: WO86/04006

PCT Pub. Date: Jul. 17, 1986

[30] Foreign Application Priority Data

Jan. 9, 1985 [FI] Finland .................. 850097

[51] Int. Cl.⁴ ............... B23K 23/00; B23K 20/00; B23K 20/26

[52] U.S. Cl. ........................... 228/18; 228/33; 228/57; 228/241; 114/51

[58] Field of Search ........... 228/241, 212, 902, 224, 228/223, 248, 18, 57, 33; 114/51; 164/53, 54

[56] References Cited

U.S. PATENT DOCUMENTS

| | | | |
|---|---|---|---|
| 1,771,472 | 7/1930 | Wattmann | 164/111 |
| 2,591,517 | 4/1952 | Dausan | 164/53 |
| 3,610,663 | 10/1971 | Lago | 228/224 |
| 3,765,355 | 10/1973 | Trowbridge | 114/51 |
| 3,871,315 | 3/1975 | Anderson | 114/51 |
| 3,890,168 | 6/1975 | Shumway | 228/241 |
| 3,948,434 | 4/1976 | Rothchild | 228/241 |
| 4,062,485 | 12/1977 | Andersen | 228/241 |

FOREIGN PATENT DOCUMENTS

| | | | |
|---|---|---|---|
| 2524362 | 1/1976 | Fed. Rep. of Germany | 228/248 |
| 51-35566 | 10/1976 | Japan | 228/241 |

Primary Examiner—Nicholas P. Godici
Assistant Examiner—Samuel M. Heinrich
Attorney, Agent, or Firm—Diller, Ramik & Wight

[57] ABSTRACT

An attachment device adapted to be fused to an underwater object which includes a housing having a fuel chamber in generally surrounding relationship to an ignition chamber, a closure normally closed in communication between the chambers, an ignition device which opens the closure and ignites the fuel in the fuel chamber creating a high temperature flame which is directed toward an end of the attachment device resting against an underwater object, the end having a fusion groove for directing the flame against a localized area of the underwater object to render the metal thereof molten, and also having one or more passages for redirecting the molten material back toward the attachment device such that upon solidification, one or more discrete rigidifying bridges of molten metal are formed, and a groove defined by a pair of lips is also positioned adjacent the end for further directing the high temperature medium to achieve effective fusion.

23 Claims, 1 Drawing Figure

U.S. Patent
Mar. 8, 1988
4,729,503
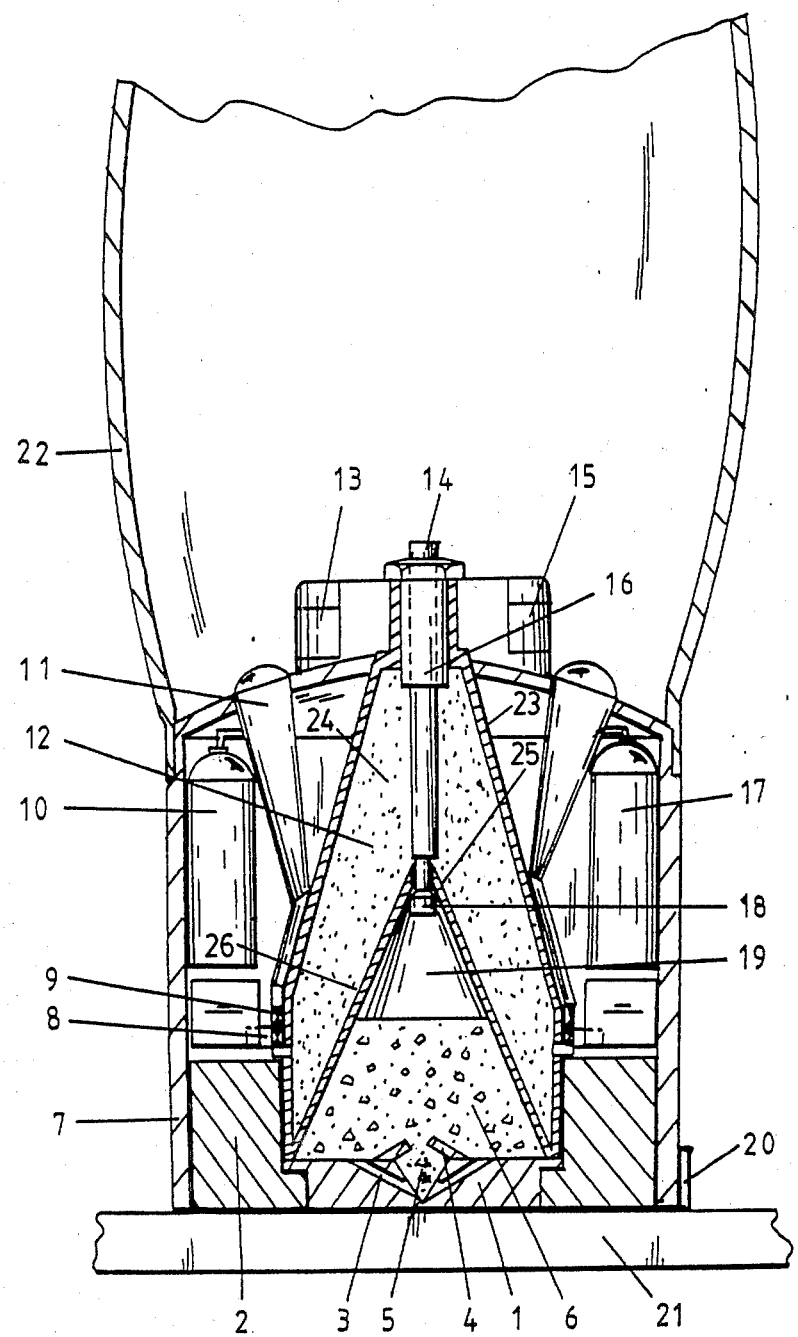

METHOD AND EQUIPMENT FOR UNDERWATER ATTACHMENT

BACKGROUND OF THE INVENTION

This invention is directed to a device which is to be welded, fused or otherwise attached to an underwater object for a variety of reasons, such as anchoring to the underwater object, lifting the underwater object, conducting searches therefrom, or other conventional underwater activities.

Equipment has heretofore been developed for achieving welded underwater joints to attach a device to an underwater object, but many of these are provided with an external power supply. Such known devices or appliances are relatively slow in operation and movement thereof is limited because of the length and stiffness of the cable carrying conventional welding current to the underwater device.

SUMMARY OF THE INVENTION

The purpose of the present invention is to eliminate disadvantages of such earlier attachment equipment by providing an attachment device which permits fast, easier and reliable underwater attachment.

In keeping with the present invention a self-contained power supply forms part of the attachment device and current therefrom creates ignition or combustion of fuel which in turn creates a flame for melting/fusing the underwater object to the attachment device.

Among many advantages of the invention is the fact that the attachment device or mechanism is relatively small and, therefore, is very versatile in its use while at the same time being capable of automatic or remote control, thus rendering movement fundamentally simple in even the most inaccessible or small underwater spaces.

BRIEF DESCRIPTION OF THE DRAWINGS

The single sheet of drawings is an axial cross-sectional view of the attachment device, and illustrates a fuel chamber and a combustion chamber with the latter being adjacent an end of the housing abutting and connected to an underwater object, and the housing end being provided with appropriate passages, lips and a recess functioning specifically as described hereinafter.

DESCRIPTION OF THE PREFERRED EMBODIMENT

A novel attachment device or mechanism constructed in accordance with this invention is generally designated by the reference numeral 7 and is in the form of a generally cup-like body having a lower opened end (unnumbered). The attachment device 7 is adapted to be placed contiguous to and/or in contact with an underwater object 21 to which the attachment device 7 is to be attached by fusion/welding. The attachment device or housing 7 is preferably made of metal and has secured conventionally therein a magnetic ring 2 which will hold the attachment device 7 against the underwater object 21 when, of course, the latter is constructed of ferrous material. Located within the magnetic ring 2 and also suitably conventionally fixed thereto is a housing end or gripping end 1 which carries or includes three distinct means 3, 4 and 5 which will be described more fully hereinafter.

The housing end or disk 1 in part defines with a conical wall 26 an ignition or combustion space or chamber 19 within which is housed a conventional admixture 6 in the form of a mixture of metallic grain dispersed in polyurethane and powdered chalk-line. Another generally conical wall 23 in spaced generally external surrounding relationship to the conical wall 26 defines a fuel chamber 24 housing fuel 12 in the form of a conventional mixture of powdered iron-nickel alloy and trinitrotoluene (TNT). Means 25 defines an opening in an apex portion (unnumbered) of the conical wall 26 for establishing communication between the fuel chamber 24 and the combustion chamber 19. However, the opening 25 is normally closed by a stem (unnumbered) of ignition means 18 in the form of a conventional ignition device which is received in a spindle 14. The spindle 14 is in turn supported by a bushing 16.

A conventional switch 20 is carried by the attachment device 7 and is activated upon contact with the underwater object 21. When the switch 20 is activated, it in turn closes a circuit which includes conventional ignition batteries 13 whereupon an electrical ignition current flows to the ignition means or ignition device 18 causing a detonation within the combustion chamber 19. As a result of the combustion/ignition or detonation and the conical shape of the wall 26, the energy of the detonation drives the stem of the ignition device 18 and the spindle 14 upwardly to open the opening 25, whereupon the mixture 12 is ignited creating a high temperature medium (flame) for subsequently melting and rendering molten the material of the underwater object 21. The opening 25 defines means for directing the flame downwardly into the combustion chamber 19 through the mixture 6 and in and through the latter toward, into and through the recess 5 burning through the limited thin wall of the housing end 1 at the bottom of the recess 5 and, of course, melting the material of the underwater object 21.

As the flame is directed downwardly by the opening 25 toward the recess 5, the flame encounters a number of combustion lips 4 which collectively define therebetween a slot which further directs the flame into the fusion groove or recess 5. The fusion groove or recess 5 is in turn of a generally downwardly diverging configuration and it also functions to further guide the flame downwardly, and the combined effect of the two means 4, 5 is to effectively localize the flame in the area of the recess 5 to achieve melting of the material of the underwater object 21 without excessive heating thereof.

As the molten metal of the underwater object 21 melts under the influence of the flame operating in the combustion chamber 19, the molten metal of the underground object 21 expands and rises upwardly, enters and is guided into and by the plurality of passage means 3 in a generally upward and outward direction. The molten metal not only enters the passages 3 but progressively fills the same, cools and solidifies to define a plurality of discrete rigid gripping ridges which rigidly connect the housing end 1 to the underwater object 21.

In order to suitably slow and/or cool down the period during fusion or cooling and achieve optimum melting of the material of the underwater object 21 and the eventual solidification thereof in the passages 3, means are provided in the form of a pressurized bottle 17 of benzene and a pressurized bottle 10 of oxygen which have outlets 11 in fluid communication with the fuel chamber 24 through a generally ring-like manifold (unnumbered). An appropriate electromagnetic shut-off valve 8 and a non-return valve 9 is provided to control the flow of the oxygen and the benzene from the respective tanks 10, 17. In this case, the electromagnetic shut-off valve 8 can be controlled by the switch 20 so as to activate the valve 8 and permit flow of the benzene and oxygen from the respective bottles 17, 10 via the outlet or discharge channels 11 into the chamber 12 as the mixture 12 burns. This assures that during cooling and solidification of the molten metal within the passages 3, the discrete bridges are strong and rigidly hold the disc 1 and, thus, the entire attachment device 7 to the underwater object 21.

It is also possible in keeping with the invention to provide batteries 15 which energize a circuit upon the valves 18 open to send an appropriate signal to a receiver to indicate that the device has operated correctly and thus has been welded/fused to the underwater object 21.

Obviously, conventional means may be provided for assuring that the attachment device is appropriately manually guided or guided through appropriate remote controls to and against the underwater object 21, and in the latter regard a torpedo-shaped portion 22 may be formed as part of the overall attachment device 7. The torpedo-shaped part 22 serves as a guide device for directing the attachment device 7 to and securing the same upon the underwater object 22.

Although in a preferred embodiment of the invention has been specifically illustrated and described herein, it is to be understood that minor variations may be made in the apparatus without departing from the spirit and scope of the invention, as defined in the appended claims.

I claim:

1. An attachment device adapted to be fused to an underwater object comprising a housing, means at an end of said housing adapted to be brought into contiguous relationship with an underwater object to which the attachment device is to be attached, means for fusing the material of the underwater object to said housing end, said fusing means including at least one passage means in said housing end for guiding molten material of the underwater object in a direction toward said housing, and said one passage means being so disposed in said housing end as to define a discrete rigidified bridge of the molten material upon the solidification thereof.

2. The attachment device as defined in claim 1 wherein said fusing means includes means for defining a chamber in which is created a high temperature medium adapted to melt the material of the underwater object, and means for directing the high temperature medium through the housing end against a localized area of the underwater object.

3. The attachment device as defined in claim 1 wherein said fusing means includes means for defining a chamber in which is created a high temperature medium adapted to melt the material of the underwater object, means for directing the high temperature medium through the housing end against a localized area of the underwater object, and said high temperature medium directing means being an inwardly opening recess in said housing end.

4. The attachment device as defined in claim 1 wherein said fusing means includes means for defining a chamber in which is created a high temperature medium adapted to melt the material of the underwater object, means for directing the high temperature medium through the housing end against a localized area of the underwater object, and said high temperature medium directing means being an inwardly opening blind recess in said housing end.

5. The attachment device as defined in claim 1 wherein said fusing means includes means for defining a chamber in which is created a high temperature medium adapted to melt the material of the underwater object, means for directing the high temperature medium through the housing end against a localized area of the underwater object, and said high temperature medium directing means is an inwardly opening inwardly diverging blind recess in said housing end.

6. The attachment device as defined in claim 1 wherein said fusing means includes means for defining a chamber in which is created a high temperature medium adapted to melt the material of the underwater object, means for directing the high temperature medium through the housing end against a localized area of the underwater object, and said high temperature medium directing means includes a pair of lips defining a slot therebetween.

7. The attachment device as defined in claim 1 wherein said fusing means includes means for defining a chamber in which is created a high temperature medium adapted to melt the material of the underwater object, means for directing the high temperature medium through the housing end aainst a localized area of the underwater object, said high temperature medium directing means being an inwardly opening recess in said housing end, and a pair of lips defining a slot therebetween for directing the high temperature medium into said recess.

8. The attachment device as defined in claim 1 wherein said fusing means includes means for defining a chamber in which is created a high temperature medium adapted to melt the material of the underwater object, means for directing the high temperature medium through the housing end against a localized area of the underwater object, said high temperature medium directing means being an inwardly opening blind recess in said housing end, and a pair of lips defining a slot therebetween for directing the high temperature medium into said recess.

9. The attachment device as defined in claim 1 wherein said fusing means includes means for defining a chamber in which is created a high temperature medium adapted to melt the material of the underwater object, means for directing the high temperature medium through the housing end against a localized area of the underwater object, said high temperature medium directing means is an inwardly opening inwardly diverging blind recess in said housing end, and a pair of lips defining a slot therebetween for directing the high temperature medium into said recess.

10. The attachment device as defined in claim 1 wherein said fusing means includes means for defining a combustion chamber and means for defining a fuel chamber, means normally closing communication between said combustion and fuel chambers, means for placing said chambers in communication with each other, and means for creating an ignition in said combustion chamber while said chambers are in communication thereby igniting fuel within said fuel chamber and creating a high temperature medium for melting and rendering molten the material of the underwater object.

11. The attachment device as defined in claim 1 wherein said fusing means includes means for defining a combustion chamber and means for defining a fuel chamber, means normally closing communication between sadi combustion and fuel chambers, means for placing said chambers in communication with each other, means for creating an ignition in said combustion chamber while said chambers are in communication thereby igniting fuel within said fuel chamber and creating a high temperature medium for melting and rendering molten the material of the underwater object, and a self-contained power source for creating ignition in the combustion chamber.

12. The attachment device as defined in claim 1 wherein said fusing means includes means for defining a combustion chamber and means for defining a fuel chamber, means normally closing communication between said combustion and fuel chambers, means for placing said chambers in communication with each other, means for creating an ignition in said combustion chamber while said chambers are in communication thereby igniting fuel within said fuel chamber and creating a high temperature medium for melting and rendering molten the material of the underwater object, and said ignition creating means being effective for placing said chambers in fluid communication by opening said closing means.

13. The attachment device as defined in claim 1 wherein said fusing means includes means for defining a combustion chamber and means for defining a fuel chamber, means normally closing communication between said combustion and fuel chambers, means for placing said chamber in communication with each other, means for creating an ignition in said combustion chamber while said chambers are in communication thereby igniting fuel within said fuel chamber and creating a high temperature medium for melting and rendering molten the material of the underwater object, said closing means being a closure between said chambers, and said ignition creating means being further effective for placing said chambers in communication by opening said closure.

14. The attachment device as defined in claim 1 wherein said fusing means includes means for defining a combustion chamber and means for defining a fuel chamber, means normally closing communication between said combustion and fuel chambers, means for placing said chambers in communication with each other, means for creating an ignition in said combustion chamber while said chambers are in communication thereby igniting fuel within said fuel chamber and creating a high temperature medium for melting and rendering molten the material of the underwater object, said fuel chamber being in generally external at least partial surrounding relationship to said combustion chamber, and said combustion chamber being in part defined by said housing end.

15. The attachment device as defined in claim 1 wherein said fusing means includes means for defining a combustion chamber and means for defining a fuel chamber, means normally closing communication between said combustion and fuel chambers, means for placing said chambers in communication with each other, means for creating an ignition in said combustion chamber while said chambers are in communication thereby igniting fuel within said fuel chamber and creating a high temperature medium for melting and rendering molten the materoal of the underwater object, and said combustion chamber being disposed generally between said fuel chamber and said housing end.

16. The attachment device as defined in claim 1 wherein said fusing means includes means for defining a combustion chamber and means for defining a fuel chamber, means normally closing communication between said combustion and fuel chambers, means for placing said chambers in communication with each other, means for creating an ignition in said combustion chamber while said chambers are in communication thereby igniting fuel within said fuel chamber and creating a high temperature medium for melting and rendering molten the material of the underwater object, and means for guiding the high temperature medium from the fuel chamber into the combustion chamber and toward the housing end.

17. The attachment device as defined in claim 10 including means for directing the high temperature medium from the combustion chamber toward the housing end.

18. The attachment device as defined in claim 10 including means for guiding the high temperature medium from the fuel chamber into the combustion chamber and toward the housing end, and further high temperature medium directing means in said housing and for further directing the high temperature medium through the housing and against a localized area of the underwater object.

19. The attachment device as defined in claim 18 wherein said further directing means is an inwardly opening blind recess in said housing end.

20. The attachment device as defined in claim 19 wherein said blind recess is in inwardly diverging relationship relative to said housing.

21. An attachment device adapted to be fused to an underwater object comprising a housing, means at an end of said housing adapted to be brought into contiguous relationship with an underwater object to which the attachment device is to be attached, means for fusing the material of the underwater object to said housing end, said fusing means including means for defining a combustion chamber and means for defining a fuel chamber, means for placing said chambers in communication with each other, means for creating an ignition in said combustion chamber while said chambers are in communication thereby igniting fuel within said fuel chamber and creating a high temperature medium for melting and rendering molten the material of the underwater object, first means for directing the high temperature medium from the fuel chamber into the combustion chamber and toward the housing end, and second means for directing the high temperature medium through the housing and against a localized area of the underwater object.

22. The attachment device as defined in claim 21 wherein said first-mentioned directing means is an opening in a common wall between said chambers.

23. The attachment device as defined in claim 21 wherein said second directing means is an inwardly opening recess in said housing end.

* * * * *